United States Patent
Tu et al.

(10) Patent No.: US 12,435,345 B2
(45) Date of Patent: Oct. 7, 2025

(54) PREHYDROLYSATE FERMENTABILITY IN BIOMASS PRETREATMENT

(71) Applicant: University of Cincinnati, Cincinnati, OH (US)

(72) Inventors: Maobing Tu, Mason, OH (US); Yu Zhang, Cincinnati, OH (US); Yequan Sheng, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 0 days.

(21) Appl. No.: 17/668,859

(22) Filed: Feb. 10, 2022

(65) Prior Publication Data

US 2022/0251610 A1    Aug. 11, 2022

Related U.S. Application Data

(60) Provisional application No. 63/147,816, filed on Feb. 10, 2021.

(51) Int. Cl.
*C12P 7/10* (2006.01)
*C10L 1/02* (2006.01)

(52) U.S. Cl.
CPC ............ *C12P 7/10* (2013.01); *C10L 1/02* (2013.01); *C10L 2200/0469* (2013.01); *C10L 2290/26* (2013.01); *C12P 2201/00* (2013.01)

(58) Field of Classification Search
CPC ........ C12P 2201/00; D21C 1/00; Y02E 50/10
USPC .......................................................... 435/161
See application file for complete search history.

(56) References Cited

U.S. PATENT DOCUMENTS

| | | |
|---|---|---|
| 7,604,967 B2 | 10/2009 | Yang et al. |
| 7,875,444 B2 | 1/2011 | Yang et al. |
| 8,318,461 B2 | 11/2012 | Tolan et al. |

OTHER PUBLICATIONS

Amit et al. Bioresour. Tech. 2015,pp. 1-27.*
Luo et al., Biotech Biofuels, 2019, pp. 12-51.*
Zhao, X.; Zhang, L.; Liu, D., "Biomass recalcitrance. Part I: the chemical compositions and physical structures affecting the enzymatic hydrolysis of lignocellulose". Biofpr. Jul. 9, 2012.
Florencio, C.; Badino, A.; Farinas, C., "Addition of Soybean Protein Improves Saccharification and Ethanol Production from Hydrothermally Pretreated Sugarcane Bagasse" BioEnergy Research (2019), Springer Science + Business Media, LLC. Jan. 3, 2019.

* cited by examiner

Primary Examiner — Tekchand Saidha
Assistant Examiner — Mohammad Y Meah
(74) Attorney, Agent, or Firm — Brent M. Peebles (57) ABSTRACT

A method for pretreating lignocellulosic biomass to improve fermentability is disclosed. The method involves reacting lignocellulosic biomass with an acidic mixture while heating at a temperature from about 120° C. to about 200° C. to produce a prehydrolysate mixture. The acidic mixture includes a dilute acid and nucleophilic proteins, hydrolyzed amino acids or combinations thereof.

8 Claims, 7 Drawing Sheets

PREHYDROLYSATE FERMENTABILITY IN BIOMASS PRETREATMENT

CROSS REFERENCE TO RELATED APPLICATIONS

This application claims priority to U.S. Provisional Application Ser. No. 63/147,816, filed Feb. 10, 2021, which application is hereby incorporated by reference in its entirety.

STATEMENT REGARDING FEDERALLY FUNDED RESEARCH OR DEVELOPMENT

This invention was made with government support under NSF-CBET 1555633 awarded by the National Science Foundation. The U.S. Government has certain rights in the invention.

TECHNICAL FIELD

The present invention relates to a method of improving the fermentability of prehydrolysates.

BACKGROUND OF THE INVENTION

Lignocellulosic biomass shows great promise to produce alternative biofuels to reduce the dependence on petroleum-based liquid fuels. Pretreatment is a necessary step to break down the recalcitrant structure and enhance subsequent enzymatic hydrolysis and microbial fermentation. Many pretreatment technologies, such as alkali, dilute acid, hot water, sulfite, ammonia fiber expansion, and organosolv processes have been developed to destroy the compact structure and enhance the bioconversion efficiency. Among them, dilute acid pretreatment has been widely applied to many substrates due to its low cost and simplicity. However, the acid hydrolysis process also produces a wide range of inhibitory compounds from the degradation of extractives, carbohydrates, and lignin in the biomass. The toxicity of these inhibitors is a major limitation to utilize the prehydrolysates for microbial fermentation. Therefore, it is important to know about the inhibition mechanisms of these inhibitors and alleviate their negative effects.

Potential inhibitors in biomass hydrolysates have been identified with analytical methods such as gas chromatography-mass spectrometry (GC/MS) in several studies. HPLC-MS/MS also has been used to characterize various acid inhibitors in biomass prehydrolysates. Olsson et al. divided these toxic compounds into four groups: carbohydrates degradation products, lignin degradation products, compounds derived from lignocellulose structure, and heavy metal ions. Common identified inhibitors from carbohydrates degradation products include furfural, hydroxymethylfurfural, and several types of acids (acetic, formic and levulinic). The inhibitors released from lignin are aromatic, polyaromatic, phenolic, and aldehydic compounds. These degradation products have been reported to be more toxic than carbohydrates degradation products for microbial fermentation. Moreover, acidic resins, taninic acids, and terpene acids derived from raw material extractives are released into the prehydrolysates during the acid hydrolysis process. These extractives show less inhibition than lignin derivatives and various acids to microbial growth. Furthermore, the corrosion of equipment in the hydrolysis process generate several heavy metal ions such as iron, chromium, nickel and copper. The combination of these compounds has synergistic effect on microbial fermentation. Palmqvist et al. reported that single acetic acid (up to 10 g/L) or single furfural (up to 2 g/L) stimulated the ethanol production. However, the combination of these two compounds showed a negative impact on the growth rate, cell mass yield, and ethanol yield. Carbonyl compounds in biomass hydrolysates account for the vast majority, structural properties of carbonyl compounds are the reaction basis of chemical reactivity.

In previous research, a wide range of detoxification methods have been developed to minimize the inhibition of prehydrolysates. Activated carbon adsorption as one typical physical detoxification method, has been reported to be able to adsorb various inhibitors efficiently. However, this method usually caused considerable loss of sugars. The addition of $Ca(OH)_2$ (overliming) is one chemical detoxification approach, which has been suggested to be one of the most effective and simple detoxification methods. Nevertheless, the gypsum salts and precipitates produced in this process significantly affect the subsequent processes. Laccase and peroxidase enzymes, which derived from white rot fungi are commonly applied as biological detoxification methods. Martin et al. removed approximately 80% of the phenolic compounds in hydrolysates by the phenoloxidase laccase treatment. However, biological detoxification usually requires high costs of enzymes and long treatment time.

Although numerous detoxification methods have been reported to minimize the toxicity of inhibitors, most of these methods require the addition of another step with extra costs. Therefore, a need still exists for the development of more efficient and low-cost detoxification methods.

SUMMARY OF THE INVENTION

The present invention addresses this need by providing a method for pretreating lignocellulosic biomass comprising reacting lignocellulosic biomass with an acidic mixture while heating at a temperature from about 120° C. to about 200° C. to produce a prehydrolysate mixture. The acidic mixture includes a dilute acid and nucleophilic proteins, hydrolyzed amino acids or combinations thereof.

In one embodiment, cysteine, histidine, lysine, tryptophan, asparagine, soy protein isolate (SPI), bovine serum albumin (BSA) or combinations thereof are used to pretreat the biomass. In another embodiment, SPI, BSA or combinations thereof are used to pretreat the biomass. In one embodiment, BSA is used to pretreat the biomass. In one embodiment, the concentration of nucleophilic proteins and/or hydrolyzed amino acids in the prehydrosylate mixture is in the range of from about 1 weight percent to about 10 weight percent of the dry weight of biomass (from about 0.1 to about 2.0 weight percent of the biomass prehydrolysate mixture). In another embodiment, the concentration of nucleophilic proteins and/or hydrolyzed amino acids in the prehydrosylate mixture is in the range of from about 3 weight percent to about 5 weight percent of the dry biomass weight. In one embodiment, the concentration of acid in the prehydrosylate mixture is in the range of 0.1 wt % to about 1 wt % of the dry weight of the biomass (from about 0.01 to about 0.2 weight percent of the biomass prehydrolysate mixture).

In another embodiment of the present invention, a method for pretreating lignocellulosic biomass is provided that comprises reacting lignocellulosic biomass with an acidic mixture while heating at a temperature from about 120° C. to about 200° C. to produce a prehydrolysate mixture. The acidic mixture includes a dilute acid and SPI, BSA or combinations thereof.

BRIEF DESCRIPTION OF THE DRAWINGS

The foregoing summary, as well as the following detailed description of preferred embodiments of the application, will be better understood when read in conjunction with the appended drawings.

FIGS. 1A and 1B are a pair of graphs showing the fermentation of dilute acid prehydrolysates with different amino acids and proteins addition.

FIGS. 3A-3E are a series of TIC-GC/MS chromatograms of the prehydrolysates showing the results of different additives in the dilute acid pretreatment.

DETAILED DESCRIPTION OF THE INVENTION

The details of one or more embodiments of the disclosed subject matter are set forth in this document. Modifications to embodiments described in this document, and other embodiments, will be evident to those of ordinary skill in the art after a study of the information provided herein.

The present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. Also, in some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The term "biomass" as used herein includes materials containing cellulose, hemicellulose, lignin, protein and carbohydrates such as starch and sugar. Common forms of biomass include trees, shrubs and grasses, corn and corn husks as well as municipal solid waste, waste paper and yard waste. Biomass high in starch, sugar, protein and oil such as corn, grains, fruits and vegetables, is usually consumed as food. Conversely, biomass high in cellulose, hemicellulose and lignin is not readily digestible by humans and is primarily utilized for wood and paper products, fuel, or is discarded as waste. "Biomass" as used herein explicitly includes branches, bushes, canes, corn and corn husks and corn stover, energy crops, forests, fruits, flowers, grains, grasses, herbaceous crops, leaves, bark, needles, logs, roots, saplings, short rotation woody crops, shrubs, switch grasses, trees, vegetables, vines, hard and soft woods. In addition, biomass includes organic waste materials generated from agricultural processes including farming and forestry activities, specifically including forestry wood waste. The term "biomass" includes virgin biomass and/or non-virgin biomass such as agricultural biomass (such as grains, e.g., corn, wheat and barley; sugarcane; cone stover, corn cobs and other inedible waste parts of food plants; grasses such as switchgrass), forestry biomass (such as wood and waste wood products), commercial organics, construction and demolition debris, municipal solid waste, waste paper, and yard waste. Municipal solid waste generally includes garbage, trash, rubbish, refuse and offal that is normally disposed of by the occupants of residential dwelling units and by business, industrial and commercial establishments, including but not limited to: paper and cardboard, plastics, food scraps, scrap wood, saw dust, and the like. In some embodiments, the lignocellulosic biomass is selected from the group including, but not limited to, corn stover, straw, bagasse, miscanthus, sorghum residue, switch grass, bamboo, water hyacinth, hardwood, hardwood, softwood, wood chips, and wood pulp.

As used herein, the term "lignocellulosic" means a composition comprising cellulose, lignin and hemicellulose and/or pentosan.

As used herein, the term "pentosan" refers to a polysaccharide containing C5 carbohydrates monomers.

While the following terms are believed to be well understood by one of ordinary skill in the art, definitions are set forth to facilitate explanation of the disclosed subject matter. Unless defined otherwise, all technical and scientific terms used herein have the same meaning as commonly understood by one of ordinary skill in the art to which the disclosed subject matter belongs.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Dilute acid pretreatment produces a considerable amount of carbonyl compounds in the prehydrolysates, which inhibits the sequential microbial fermentation. To reduce the carbonyl inhibition, the present invention takes the novel approach of pretreatment of a lignocellulosic biomass with amino acids and/or proteins to improve the fermentability of prehydrolysates. In one embodiment, nucleophilic proteins and/or hydrolyzed amino acids are used to pretreat the biomass. In another embodiment, cysteine, histidine, lysine, tryptophan, asparagine, soy protein isolate (SPI). bovine serum albumin (BSA) or combinations thereof are used to pretreat the biomass. In another embodiment, SPI, BSA or combinations thereof are used to pretreat the biomass. In one embodiment, BSA is used to pretreat the biomass. In one embodiment, the concentration of nucleophilic proteins and/or hydrolyzed amino acids in the prehydrosylate mixture is in the range of from about 1 weight percent to about 10 weight percent of the dry weight of the biomass (about 0.1 to about 2.0 weight percent of the biomass prehydrolysate mixture). In another embodiment, the concentration of nucleophilic proteins and/or hydrolyzed amino acids in the prehydrosylate mixture is in the range of from about 3 weight percent to about 5 weight percent.

In one embodiment, the dilute acid pretreatment method involves reacting lignocellulosic biomass with an acidic mixture while heating at a temperature from about 120° C. to about 200° C. to produce a prehydrolysate mixture. The acidic mixture includes one or more nucleophilic amino acids, hydrolyzed proteins, or combinations, and a dilute acid. As shown in the examples below, the resulting prehydrolysate has improved fermentability. After this initial treatment, the prehydrolysate can be processed via fermentation.

The dilute acid is used to fractionate the lignocellulosic biomass. Different kinds of acids may be used (e.g. acetic acid, HCl or sulfuric acid). In one embodiment, sulfuric acid is utilized as the acid. In another embodiment, the concentration of acid in the prehydrosylate mixture is in the range of from about 0.1 wt % to about 5 wt % of the dry weight of the biomass. In one embodiment, the concentration of acid in the prehydrosylate mixture is in the range of from about 0.1 wt % to about 1 wt % of the dry weight the biomass (from about 0.01 to about 0.2 weight percent of the biomass prehydrolysate mixture). In another embodiment, pretreatment is conducted at a temperature from about 120° C. to about 200° C. In one embodiment, pretreatment is conducted at a temperature from about 160° C. to about 180° C. Residence times for the pretreatment step range from a few seconds to approximately one hour.

The examples presented below show the results of studies where various nucleophiles were added, including amino acids (cysteine and histidine) and commercial proteins (SPI and BSA) into the dilute acid pretreatment of aspen to reduce the inhibition of prehydrolysates without an additional detoxification process (see examples). Yeast fermentations were performed to examine the fermentability of the prehydrolysates with and without additives. The composition changes in the prehydrolysates were also elucidated by GC/MS. Enzymatic hydrolysis of the pretreated substrates were investigated to evaluate the pretreatment efficiency. In addition, the detoxification efficiency of BSA for biomass prehydrolysates was tested.

Regarding the results, although all the additives, including cysteine, histidine, soy protein isolate (SPI) and bovine serum albumin (BSA), improved the fermentability of prehydrolysates, only SPI and BSA did not decrease the enzymatic digestibility of the pretreated substrates, and BSA was the most effective additives in case of fermentability and enzymatic hydrolysis. It increased the ethanol productivity of prehydrolysates from 0.33 g/L/h (without addition) to 1.54 g/L/h. The final yield was promoted from 0.05 to 0.44 g/g. For BSA detoxification, only high temperature (60° C.) has resulted in prehydrolysate fermentable with highly carbonyl inhibitors removal. Gas chromatography-mass spectrometry (GC/MS) revealed that aromatic carbonyl compounds were the major inhibitors rather than furan compounds.

The addition of cysteine, histidine, soy protein isolate and bovine serum albumin in the dilute acid pretreatment of aspen improved the fermentability of prehydrolysates. Two kinds of proteins increased the enzymatic hydrolysis by 1.44-5.17%, while two kinds of amino acids decreased the enzymatic digestibility of pretreated substrates. Therefore, these two proteins improved the efficiency of aspen dilute acid pretreatment, including reducing prehydrolysate inhibition and promoting substrate bioconversion. All additives could effectively remove aromatic monomers, due to the reaction between the electrophilic carbonyl carbon of aromatic aldehydes and the nucleophilic amino groups of additives. Additionally, the detoxification efficiency of BSA in the prehydrolysate was related to the temperature. Overall, we have found that BSA and SPI are proven as effective pretreatment enhancers, especially for the inhibition removal of prehydrolysate.

EXAMPLES

Chemical and Reagents

Aspen wood chips (*Populus tremuloides*) (6 mm×38 mm) were provided by the Wisconsin Rapids mill of Stora Enso North America. These wood chips were kept at 4° C. with vacuum until used. Glucose, mannose, galactose, xylose, arabinose, cysteine, histidine, acetic acid, 5-methylfurfural, levulinic acid, phenol, benzoic acid, guaiacylacetone, vanillin, syringaldehyde and syringlacetone were obtained from Sigma-Aldrich (St. louis, MO). Soy protein isolate (SPI) was purchased from Acros organics (Morris Plains, NJ). Calcium carbonate ($CaCO_3$) and bovine serum albumin (BSA) were purchased from Alfa Aesar (Ward Hill, MA). Formic acid, furfural and hydroxymethylfurfural (HMF) were purchased from Fisher Scientific (Fair Lawn, NJ). Peptone was purchased from Research Products International (Prospect, IL). All chemical reagents were of analytic grade.

Example 1—Dilute Acid Pretreatment of Aspen

The chemical composition of untreated aspen was 43.39% glucan, 16.40% xylan, 1.59% galactan, 1.19% arabinan, 1.67% mannan, 22.15% lignin and 3.2% extractives. This analysis was carried out according to the NREL protocol. All pretreatment experiments were carried out in a Parr batch pressure vessel (model of 4520 of 2.0 L of capacity) (Parr Instrument Co., Moline, IL). Briefly, aspen wood chips (80 g, dry weight) were soaked overnight in 1% sulfuric acid (based on the dry weight of biomass) in 7:1 liquor/solid ratio prior to the pretreatment. To reduce inhibition of prehydrolysates, 4% cysteine, histidine, and SPI and 1, 2, 3, 4% BSA (based on the dry weight of biomass) were added into the pretreatment liquor, respectively. All the pretreatment processes were conducted at 170° C. in 60 min. After pretreatment, the stirred reactor was quenched in a bucket with cold water. The slurry after pretreatment was separated into solid fraction and liquid fraction by vacuum filtration. The liquid fraction (prehydrolysates) was stored at 4° C. and used for subsequent analyses and fermentation. The pretreated substrates were washed with 560 mL warm water at least three times and collected by vacuum filtration.

Example 2—Enzymatic Hydrolysis of Dilute Acid Pretreated Substrates

Commercial cellulase (Novozym 22C) was provided by Novozymes (Franklinton, NC) and used for the enzymatic hydrolysis. Novozym 22C (92 FPU per mL) is a cocktail of cellulase enzymes with enough β-glucosidase activity (343 IU mL-1). Each enzymatic hydrolysis experiment was performed in a 250 mL flask at 2% glucan (w/v) in 50 mL of 50 mM sodium citrate buffer (pH 4.8). The loading of Novozym 22C was 10 FPU/g glucan. The flasks were placed on an incubator shaker (150 rpm) and the temperature was controlled at 50° C. for 72 h. The samples (0.5 mL) were taken from the hydrolysis solution at intervals (0, 3, 6, 12, 24, 48, 72 h). The released glucose in the enzymatic hydrolysis was used to calculate the hydrolysis yield. Initial hydrolysis rate was calculated based on the released glucose in the first 3 h of enzymatic hydrolysis. Enzymatic hydrolysis was carried out in duplicate, and the results were presented as the average of two replicates.

Example 3—Detoxification of Biomass Prehydrolysates with BSA

The pH of prehydrolysates was adjusted to 6 by $CaCO_3$. The glucose concentration in the prehydrolysates was adjusted around 20 g/L by the addition of pure glucose. The biomass prehydrolysates were treated with BSA (0.2% w/v) at 20 and 60° C. for 2 h. The detoxification experiments were conducted in a 250 mL flask, which was placed in a temperature-controlled water bath. The precipitates were removed by centrifugation. The liquid part was kept for yeast fermentation and GC/MS analysis. The detoxification treatments were performed in duplicates.

Example 4—Yeast Fermentation of Dilute Acid Pretreatment Liquors

Fleischmann's pure dry yeast, *Saccharomyces cerevisiae* was stored at 4° C. and used for the ethanol fermentation. The strain was grown at 30° C. overnight in yeast extract peptone dextrose medium (YPD) containing glucose (20 g/L), peptone (20 g/L) and yeast extract (10 g/L). The concentration of yeast suspensions was determined by UV-spectrophotometer at 600 nm. The initial yeast inoculation of 2.0 g/L was added into the ethanol fermentation. Batch fermentation was taking place in a 250 mL flask with 50 mL prehydrolysates without any extra nutrients. The glucose concentration in prehydrolysates was brought to approximately 20 g/L by adding pure glucose. Moreover, excessive $CaCO_3$ was added to adjust the pH of prehydrolysates to 6. Then, the solution was filtered to remove $CaCO_3$ and other impurities through the membrane filter (0.22 μm). All fermentation experiments were incubated at 30° C. and 150 rpm for 48 h in an incubator shaker (E24, New Brunswick Scientific). The samples were taken from the fermentation solution at intervals (0, 3, 6, 9, 12, 24, 48 h). Fermentation was conducted in duplicate. The volumetric ethanol productivity ($Q_{EtOH}$) was calculated based on the produced ethanol in the first 6 h of fermentation as described previously. The initial consumption rate of glucose ($R_G$) were calculated based on the glucose consumed in the first 6 h of fermentation.

Example 5—High-Performance Liquid Chromatograph (HPLC) Analysis

The sugar concentrations were detected by an Agilent 1260 HPLC system equipped with a Bio-Rad HPX-87P column (300×7.8 mm) connected to a refractive index detector (RID-10A). The mobile phase was deionized water with the flow rate of 0.6 mL min-1. The column temperature and detector temperature were kept at 80, and 45° C., respectively. Formic acid, acetic acid and levulinic acid, furfural, HMF and ethanol were determined with an Aminex HPX-87H column (300×7.8 mm) chromatography with a RID detector. The column was kept at 45° C. with the mobile phase of aqueous 5.0 mM $H2SO4$, flow rate at 0.6 mL/min.

Example 6—Gas Chromatography-Mass Spectrometry (GC/MS) Analysis

The inhibitors extracted from the aspen prehydrolysates were determined as described previously. Briefly, the inhibitors in 20 mL prehydrolysate were extracted with 20 mL dichloromethane (DCM) twice. About 10 g anhydrous sodium sulfate was used to remove the residual water, and the solution from DCM extraction was collected and concentrated to 2 mL by a nitrogen blowing concentrator (TurboVap II workstation). GC/MS analysis was performed on an Agilent 7890B equipped with mass selective detector. An Ultra Alloy-5 column (Frontier-lab, 30 m length, 0.25 mm id., and 0.25 μm thickness) was employed to achieve chromatographic separation of the analytes. The electron ionization ion source was held at 70 eV and 250° C. The mass spectra were scanned from 30 to 700. The oven temperature was maintained at 60° C. for 6 min to delay the solvents, and then increased to 105° C. (12° C./min ramping, 2 min holding); to 160° C. (15° C./min ramping, 2 min holding); and finally increased to 315° C. (10° C./min ramping, 8 min holding). The accumulated running time was 40 min.

Figure 1A:
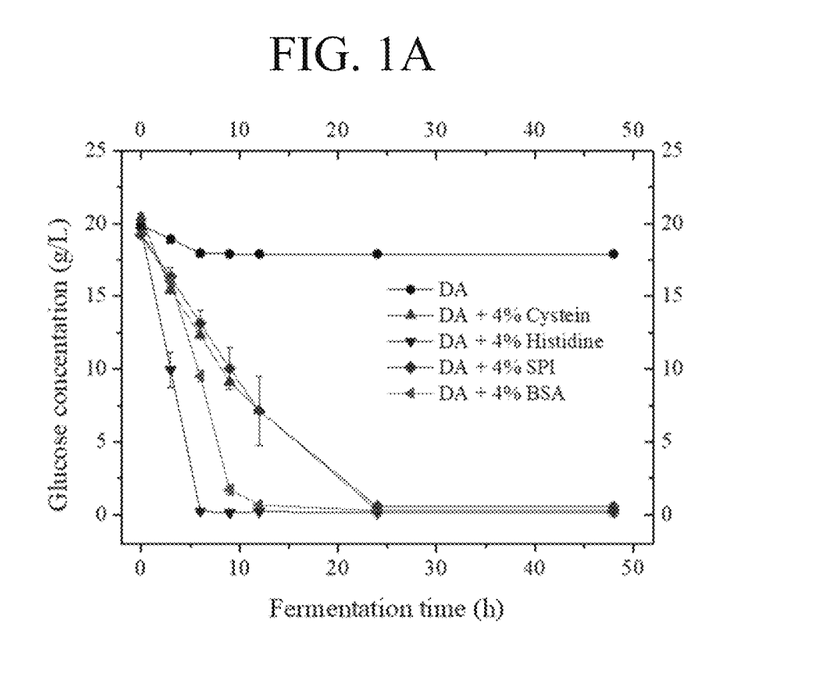
FIG. 1A shows glucose consumption.
Figure 1B:
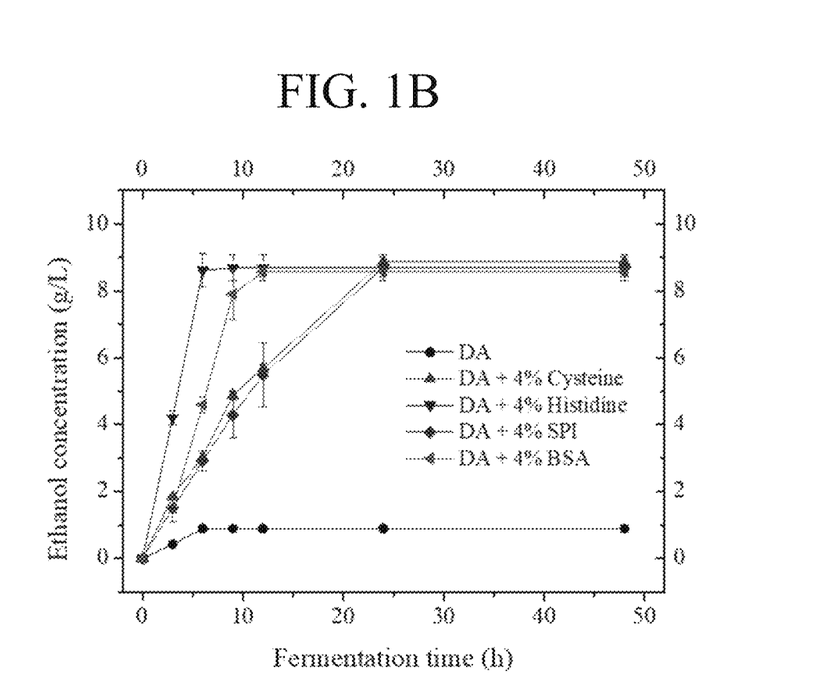
FIG. 1B shows ethanol production.

Example 7—Effect of Nucleophilic Additives in Biomass Pretreatment on Prehydrolysates Fermentability To examine whether adding nucleophilic additives in pretreatment can enhance prehydrolysate fermentability, cysteine, histidine, soy protein isolate (SPI) and bovine serum albumin (BSA) were added in the dilute acid pretreatment of aspen. The prehydrolysate with spiked glucose was fermented by *S. cerevisiae* for 48 h, and the glucose consumption rates, ethanol productivity, final concentration and ethanol yields were determined (FIG. 1). The results showed four additives enhanced the prehydrolysates fermentability significantly. Pretreatment with cysteine and histidine enabled glucose completely to be consumed at 24 and 6 h, respectively. Their final ethanol concentration reached 8.87 and 8.69 g/L, respectively. Similarly, pretreatment with SPI and BSA enabled glucose to be consumed at 24 and 12 h, respectively. Their final ethanol concentrated reached 8.70 and 8.56 g/L, respectively. The prehydrolysates from pretreatment without additives (control) only generated 0.90 g/L of ethanol and most glucose was not consumed at 48 h.

The addition of cysteine, histidine, SPI and BSA increased the glucose consumption rate from 0.32 g/L/h (control) to 1.35, 3.22, 1.02 and 1.61 g/L/h, respectively. Correspondingly, the addition of cysteine, histidine, SPI and BSA increased the volumetric ethanol productivity from 0.15 g/L/h to 0.51, 1.44, 0.49 and 0.77 g/L/h, respectively. The results indicated that these four additives can in-situ detoxify the prehydrolysates in dilute acid pretreatment. Histidine appeared to be the most effective one, and BSA was the second best.

BSA protein with a total of 607 amino acids contains 35 cysteines (6.2%), 17 histidines (3.8%) and 60 lysines (12.8%). Our results show that the combination of cysteine, histidine and lysine residues detoxified the prehydrolysates during the pretreatment and improved its fermentability. Soy protein typically has 15 amino acids with 2.3% histidine and 6.3% lysine and do not have cysteine. Without being bound by theory, the higher percentage of nucleophilic amino acids in BSA was likely the reason for its better detoxification efficiency in biomass pretreatment than soy protein. It should be noted that amino acids can be generated from protein by acid hydrolysis. As a result, both nucleophilic proteins and the hydrolyzed amino acids can react with carbonyl inhibitors and detoxify the biomass prehydrolysates.

Figure 2:
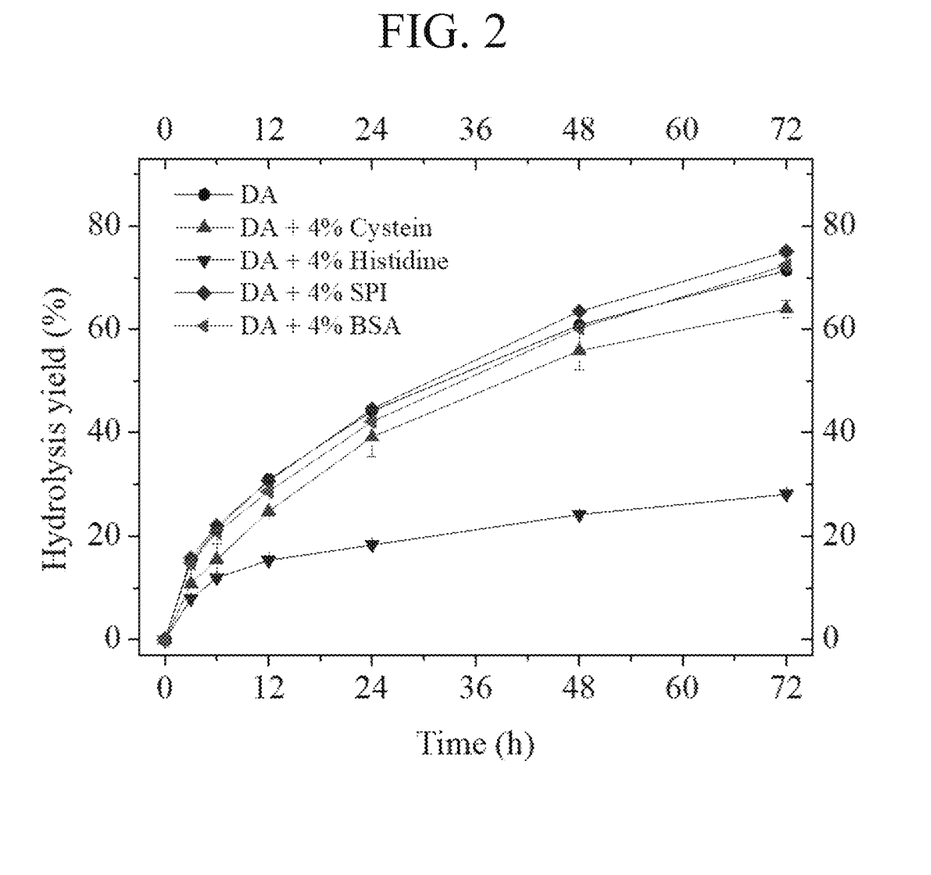
FIG. 2 is a graph showing the time course of enzymatic hydrolysis of dilute acid pretreated biomass with amino acids and proteins addition.
Figure 3A:
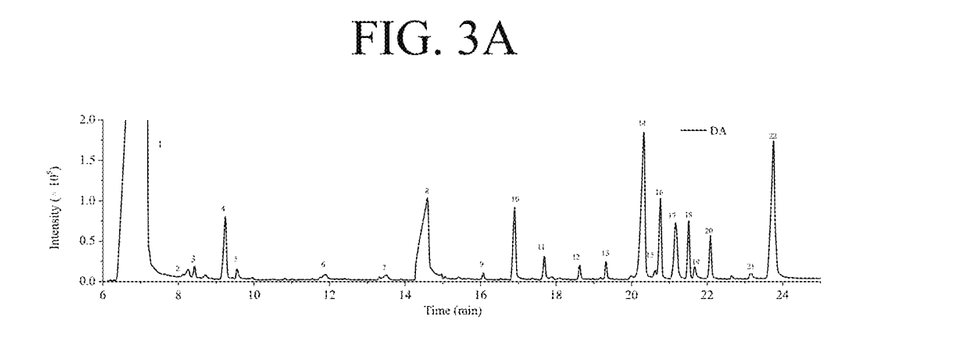
FIG. 3A shows results with no additives.
Figure 3B:
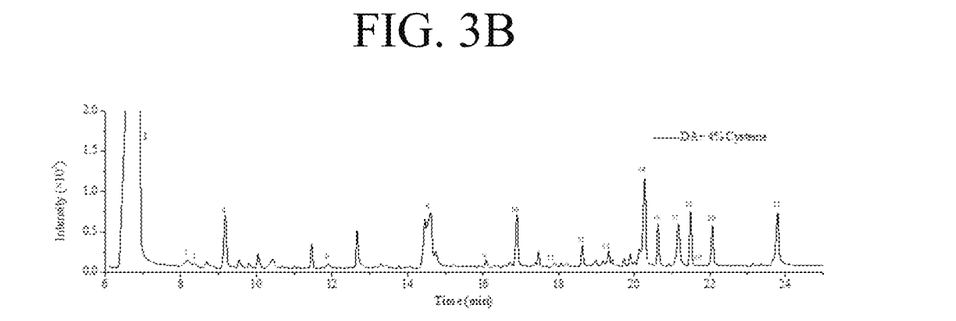
FIG. 3B shows results with 4% (w/w) cysteine.
Figure 3C:
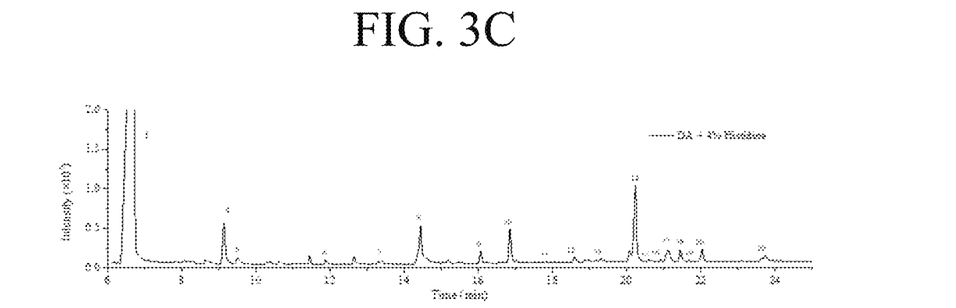
FIG. 3C shows results with 4% (w/w) histidine.
Figure 3D:
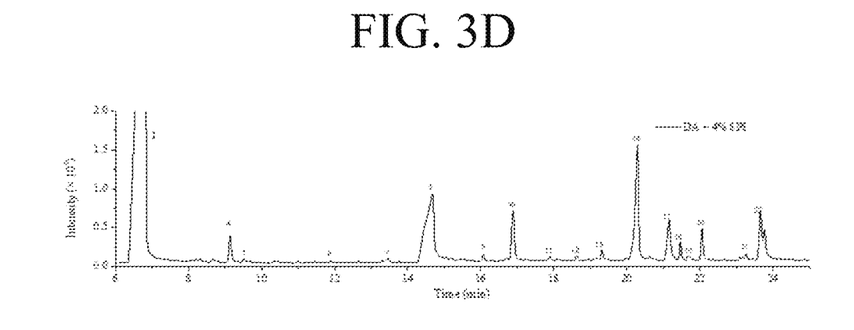
FIG. 3D shows results with 4% (w/w) SPI.
Figure 3E:
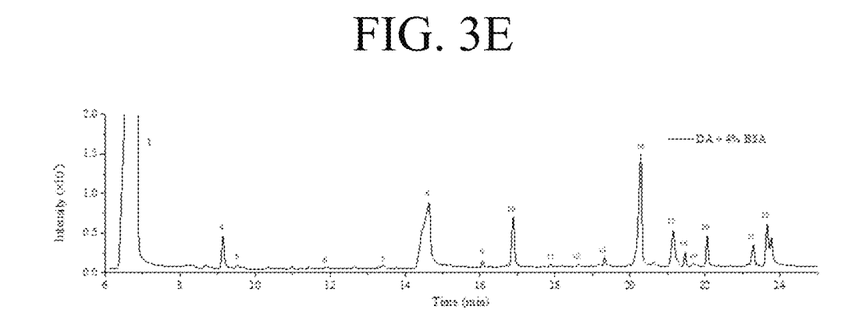
FIG. 3E shows results with 4% (w/w) BSA.

Example 8—Effect of Nucleophilic Additives in Biomass Pretreatment on Substrates Digestibility Although nucleophilic amino acids and protein increased the prehydrolysates fermentability significantly, their effects on pretreated substrates digestibility were also important. To assess whether the addition of amino acids and protein in pretreatment can increase or decrease the substrates digestibility, the dilute acid pretreated aspen substrates (DAPA-Cys, DAPA-His, DAPA-SPI and DAPA-BSA) from the pretreatment with cysteine, histidine, SPI and BSA were enzymatically hydrolyzed at 50° C. for 72 h with 10 FPU/g glucan of Novozym 22C (FIG. 2). Their 72 hydrolysis yields were compared with the control substrates (DAPA). Unexpectedly, it was observed that 72 h hydrolysis yields of DAPA-Cys and DAPA-His decreased from 71.35% (DAPA) to 63.93% and 28.11%, respectively. While the 72 hydrolysis yields of DAPA-SPI and DAPA-BSA increased to 75.04%, and 72.38%, respectively, as compared to the control. Similarly, the initial hydrolysis rates of DAPA-Cys (0.80 g/L/h) and DAPA-His (0.58 g/L/h) were much lower than that from the control (DAPA, 1.12 g/L/h), the initial hydrolysis rates of DAPA-SPI and DAPA-BSA were comparable to the control. Although the residual lignin content (Table 1) in all pretreated substrates was the same around 28.4%, the xylan contents from DAPA-Cys (7.63%) and DAPA-His (9.74%) were much higher than that in DAPA (3.22%). The xylan contents of DAPA-SPI and DAPA-BSA were 4.85% and 4.96%, respectively. This indicated that the amount of residual lignin did not play a significant role in the initial hydrolysis of pretreated substrates. The residual xylan in DAPA-His was 3-fold higher than that in DAPA, which resulted in 2-fold lower of its initial hydrolysate rate than that from DAPA. A strong correlation between xylan content and the initial hydrolysis rate has been observed ($r2=0.91$). This indicated that higher residual xylan limit the initial enzymatic hydrolysis. Similar observation has been reported on the role of residual xylan in organosolv pretreated loblolly pine. Xylan (1.67 g/L) has been shown to reduce the initial hydrolysis rate of Avicel by 34.5%. Xylooligomers have been reported to inhibit the initial hydrolysis rate of Solka Floc by 40%. In this example, the pretreated substrates were washed and the presence of xylooligomers was less likely.

TABLE 1

Chemical compositions of raw material and dilute acid pretreated substrates

| Biomass | Glucan | Xylan | Galactan | Arabinan | Mannan | Acid insoluble lignin | Acid soluble lignin |
|---|---|---|---|---|---|---|---|
| Raw material | 43.39 ± 0.50 | 16.40 ± 0.12 | 1.59 ± 0.01 | 1.19 ± 0.23 | 1.67 ± 0.26 | 21.20 ± 0.79 | 2.47 ± 0.04 |
| DA | 60.43 ± 0.18 | 3.22 ± 0.28 | 0.32 ± 0.03 | 0.61 ± 0.58 | 1.36 ± 0.24 | 28.39 ± 0.46 | 2.39 ± 0.08 |
| DA-cysteine | 57.57 ± 0.02 | 7.63 ± 0.11 | 0.28 ± 0.21 | 0.51 ± 0.05 | 1.24 ± 0.05 | 28.39 ± 0.21 | 2.27 ± 0.02 |
| DA-histidine | 55.54 ± 0.05 | 9.74 ± 0.21 | 0.56 ± 0.02 | 0.45 ± 0.02 | 2.01 ± 0.01 | 28.47 ± 0.05 | 2.36 ± 0.01 |
| DA-SPI | 58.57 ± 0.01 | 4.85 ± 0.21 | 0.45 ± 0.07 | 0.54 ± 0.02 | 1.46 ± 0.08 | 28.37 ± 0.40 | 2.18 ± 0.04 |
| DA-BSA | 56.72 ± 0.18 | 4.96 ± 0.18 | 0.51 ± 0.02 | 0.52 ± 0.01 | 1.49 ± 0.07 | 28.26 ± 0.01 | 2.38 ± 0.05 |

TABLE 2

Sugars and inhibitors concentrations in the prehydrolysates

| Prehydrolysates | Sugar concentration (g/L) | | | | | Formic acid | Acetic acid | Levulinic acid |
| | Glucose | Xylose | Galactose | Arabinose | Mannose | | | |
|---|---|---|---|---|---|---|---|---|
| DA | 2.83 ± 0.09 | 18.44 ± 0.28 | 1.04 ± 0.02 | 0.55 ± 0.03 | 1.95 ± 0.12 | 1.03 ± 0.01 | 5.73 ± 0.25 | 0.56 ± 0.01 |
| DA-cysteine | 0.95 ± 0.02 | 7.29 ± 0.05 | 0.32 ± 0.05 | 0.51 ± 0.02 | 0.89 ± 0.05 | 0.46 ± 0.04 | 3.13 ± 0.09 | 0.36 ± 0.01 |
| DA-histidine | 0.43 ± 0.06 | 2.39 ± 0.08 | 0 | 0 | 0.25 ± 0.03 | 0.56 ± 0.05 | 2.59 ± 0.06 | 0.36 ± 0.02 |
| DA-SPI | 1.84 ± 0.20 | 13.47 ± 0.26 | 0.56 ± 0.01 | 0.15 ± 0.02 | 1.46 ± 0.08 | 0.47 ± 0.02 | 3.85 ± 0.15 | 0.36 ± 0.02 |
| DA-BSA | 1.64 ± 0.07 | 12.40 ± 0.07 | 0.51 ± 0.01 | 0.15 ± 0.04 | 1.43 ± 0.13 | 0.51 ± 0.04 | 3.89 ± 0.23 | 0.38 ± 0.12 |
| DA | 2.83 ± 0.09 | 18.44 ± 0.28 | 1.04 ± 0.02 | 0.55 ± 0.03 | 1.95 ± 0.12 | 1.03 ± 0.01 | 5.73 ± 0.25 | 0.56 ± 0.01 |
| DA-cysteine | 0.95 ± 0.02 | 7.29 ± 0.05 | 0.32 ± 0.05 | 0.51 ± 0.02 | 0.89 ± 0.05 | 0.46 ± 0.04 | 3.13 ± 0.09 | 0.36 ± 0.01 |
| DA-histidine | 0.43 ± 0.06 | 2.39 ± 0.08 | 0 | 0 | 0.25 ± 0.03 | 0.56 ± 0.05 | 2.59 ± 0.06 | 0.36 ± 0.02 |
| DA-SPI | 1.84 ± 0.20 | 13.47 ± 0.26 | 0.56 ± 0.01 | 0.15 ± 0.02 | 1.46 ± 0.08 | 0.47 ± 0.02 | 3.85 ± 0.15 | 0.36 ± 0.02 |
| DA-BSA | 1.64 ± 0.07 | 12.40 ± 0.07 | 0.51 ± 0.01 | 0.15 ± 0.04 | 1.43 ± 0.13 | 0.51 ± 0.04 | 3.89 ± 0.23 | 0.38 ± 0.12 |

Considering both the prehydrolysate fermentability and substrates digestibility, SPI and BSA are potentially the better additives to enhance the prehydrolysate fermentability without sacrificing the negative effects on enzymatic hydrolysis. In the following examples, the inhibitors contents in the prehydrolysates with the addition if nucleophilic additives were examined.

Example 9—Effect of Nucleophilic Additives in Biomass Pretreatment on Inhibitors Concentrations To investigate the effects of the additives on inhibitors concentration in the prehydrolysates, HPLC and GC-MS were used to determine the sugars, aliphatic acids and inhibitors in the biomass prehydrolysates (Table 2 and FIG. 3). The results showed that the addition of nucleophilic additives significantly reduced the released glucose and xylose. Specifically, the glucose and xylose concentrations in cysteine-assisted pretreatment (DA-Cys) decreased by 3-fold from 2.83 g/L and 18.44 g/L (control) to 0.95 and 7.29 g/L, respectively. The glucose and xylose from DA-His prehydrolysate was 7 fold lower than those in the control. For the prehydrolysate from DA-SPI and DA-BSA, the glucose and xylose dropped similarly by 1.5 fold. The reduction of sugar contents could result from the maillard reaction between the amino acids (or proteins with amino groups) and reducing sugars in the biomass prehydrolysate. The addition of amino acids or proteins could also reduce the pretreatment severity due to their buffering capacity. Histidine buffer has been used in biological system, and most proteins with positively charged amino groups and negatively charged carboxyl groups have been suggested to function as buffers in biological cells. The higher residual xylan in DAPA-Cys, DAPA-His, DAPA-SPI and DAPA-BSA also indicated the decrease of pretreatment severity (Table 1). In addition, the formic, acetic and levulinic acids in all the prehydrolysates dropped by 35-55% as compared to the control.

For potential inhibitors, the compounds were extracted by dichloromethane from different prehydrolysates and determined by GC/MS (FIG. 3). In total, about 22 potential inhibitory compounds from the prehydrolysate have been identified and quantified, which include furfural, 5-methylfurfural, hydroxymethylfurfural (HMF), vanillin, syringaldehyde, homosyringaldehyde and syrngylacetone (Table 3). The results showed the addition of cysteine, histidine, SPI and BSA significantly reduced the inhibitors concentration in the prehydrolysates. Specifically, furfural concentration in the prehydrolysates of DA-Cys, DA-His, DA-SPI and DA-BSA decreased by 42%, 37%, 59% and 51%, respectively. 5-methylfurfural (in DA-Cys, DA-His, DA-SPI and DA-BSA) decreased by 19%, 35.5%, 59% and 52%, respectively. HMF concentration (in DA-Cys, DA-His, DA-SPI and DA-BSA) dropped by 51%, 93%, 86% and 69%, respectively. Vanillin (in DA-Cys, DA-His, DA-SPI and DA-BSA) decreased by 29%, 56%, 25% and 29%, respectively. Syringaldehyde (in DA-Cys, DA-His, DA-SPI and DA-BSA) dropped by 50%, 63%, 24% and 29% respectively. The results showed the addition of histidine reduced inhibitors much more than cysteine, SPI and BSA. This corresponded with its best improvement of glucose consumption rate in prehydrolysates fermentation. Although vanillin and HMF were not strong inhibitors, they may be important indicators of prehydrolysates toxicity.

TABLE 3

Effects of amino acids and proteins addition on inhibitors removal of prehydrolysates

| GC peak | Compound name | RT$^a$ (min) | m/z | DA | 4% Cysteine | 4% Histidine | 4% SPI | 4% BSA |
|---|---|---|---|---|---|---|---|---|
| | Furan derivatives | | | 4567.4 | 2545.4 | 2020.7 | 2516.7 | 2501.9 |
| 1 | Furfural | 6.794 | 96 | 2957.6 | 1706.7 | 1860.3 | 1207.9 | 1447.7 |
| 2 | 2-Acetylfuran | 8.106 | 110 | 4.9c | 10.0c | NA | NA | NA |
| 4 | 5-Methylfurfural | 9.211 | 110 | 63.3 | 51.4 | 40.8 | 25.7 | 30.4 |
| 6 | 2,5-Furandicarboxyaldehyde | 11.893 | 124 | 60.9c | 15.4c | 11.6c | 1.5c | 2.5c |
| 8 | Hydroxymethylfurfural | 14.502 | 126 | 1480.7 | 715.2 | 108.0 | 1281.6 | 1021.3 |
| | Aliphatic derivatives | | | 20.6 | 4.5 | NA | NA | NA |
| 3 | 2,5-Hexandeione | 8.415 | 114 | 20.6c | 4.5c | NA | NA | NA |
| | Aromatic monomers | | | 552.4 | 381.3 | 131.1 | 261.8 | 245 |
| 5 | Phenol | 9.550 | 94 | 6.7 | NA | 5.1 | NA | 2.9 |
| 7 | Benzoic acid | 13.441 | 122 | 8.0 | NA | 8.6 | 4.7 | 4.7 |
| 9 | 3,4,5-Trihydroxybenzaldehyde | 16.093 | 154 | 2.8e | 4.3e | 5.2e | 2.2e | NA |
| 10 | Vanillin | 16.874 | 152 | 55.5 | 39.2 | 24.4 | 41.8 | 39.6 |
| 11 | Homovanillin | 17.685 | 166 | 15.4d | 2.6d | 6.0d | 3.6d | NA |
| 12 | Guaiacylacetone | 18.628 | 180 | 5.4 | 11.6 | 2.9 | NA | 2.0 |
| 13 | 1-(4-Hydroxy-3-methoxyphenyl)propane-1,2-dione | 19.335 | 194 | 9.1d | 11.4d | 3.6d | 5.8d | 5.4d |
| 14 | Syringaldehyde | 20.323 | 182 | 104.4 | 51.8 | 39.1 | 79.2 | 74.3 |
| 15 | Hydroxypropiovanillone | 20.617 | 196 | 5.9d | NA | 0.9d | 1.0d | NA |
| 16 | Homosyringaldehyde | 20.735 | 196 | 35.3e | 21.0e | 0.8e | NA | NA |
| 17 | 1-Hydroxy-3-(4-hydroxy-3-methoxyphenyl)propan-2-one | 21.192 | 196 | 53.5d | 56.0d | 10.0d | 42.5d | 38.8d |
| 18 | Syringylacetone | 21.501 | 210 | 58.2 | 78.9 | 12.8 | 17.6 | 13.2 |
| 19 | (2E)-4-(4-hydroxy-3-methoxyphenyl)but-2-enal | 21.678 | 192 | 5.1d | 0.3d | NA | 3.7d | 2.5d |
| 20 | 1-(4-Hydroxy-3,5-dimethoxyphenyl)propane-1,2-dione | 22.047 | 224 | 26.2e | 20.6e | 5.3e | 13.1e | 12.1e |

TABLE 3-continued

Effects of amino acids and proteins addition on inhibitors removal of prehydrolysates

| GC peak | Compound name | RT[a] (min) | m/z | DA | Inhibitor concentration (mg L$^{-1}$) 4% Cysteine | 4% Histidine | 4% SPI | 4% BSA |
|---|---|---|---|---|---|---|---|---|
| 21 | 2-Hydroxy-1-(4-hydroxy-3,5-dimethoxyphenyl)propan-1-one | 23.211 | 226 | 5.6e | NA | NA | 3.0e | 12.7e |
| 22 | 2-Hydroxy-1-syringyl-ethanone | 23.815 | 226 | 155.9e | 83.6e | 6.4e | 42.0e | 36.8e |

[a]RT are shortened for the retention time.
b: Inhibitor residual was calculated based on the intergradation area of each compound.
cthe concentration was determined by the calibration of hydroxymethylfurfural.
dthe concentration was determined by the calibration of vanillin.
ethe concentration was determined by the calibration of syringaldehyde.

Figure 4:
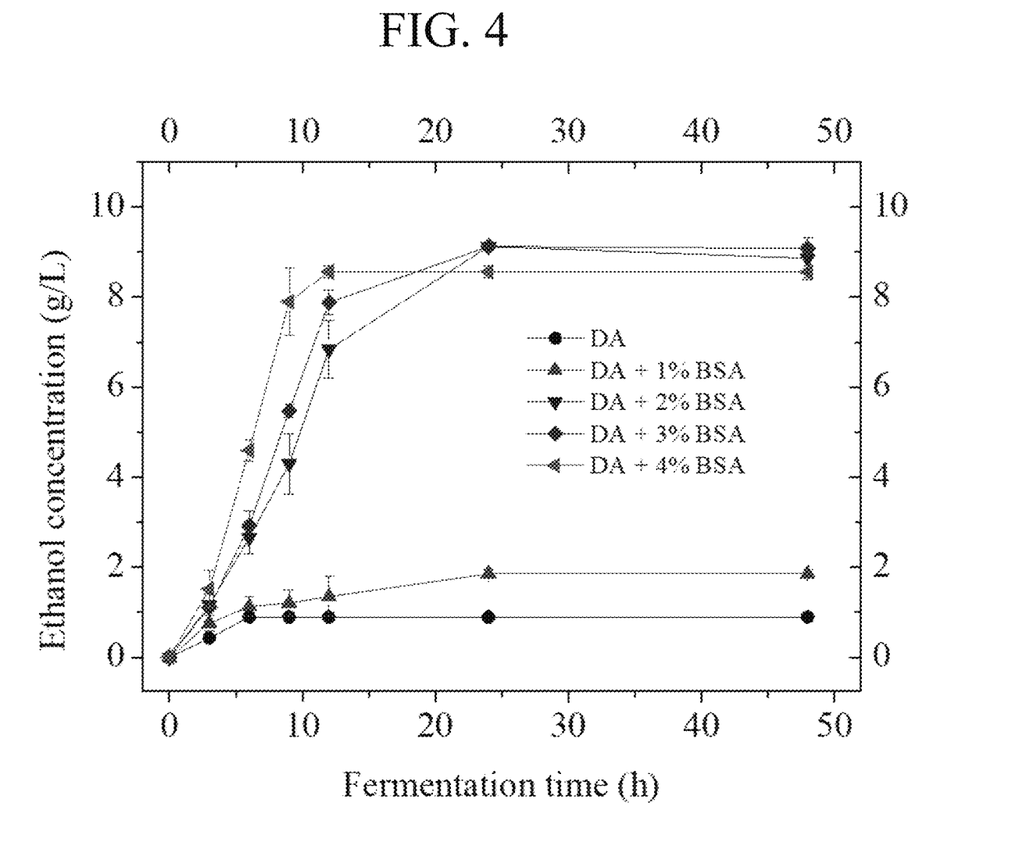
FIG. 4 is a graph showing the effects of BSA concentrations on ethanol production of prehydrolysates.

Example 10—Effects of BSA Concentration in Biomass Pretreatment on Prehydrolysates Fermentability To assess whether lower BSA concentration can be used to improve prehydrolysates fermentability, different amounts of BSA (1%, 2%, 3% and 4% w/w) were added into the dilute acid pretreatment of aspen (FIG. 4). The results showed a BSA concentration of more than 2% enhanced the prehydrolysates fermentability significantly. Specifically, the prehydrolysates from 1% of BSA was barely fermentable, its final ethanol concentration was only 1.86 g/L at 48 h, while the prehydrolysates from 2% and 3% BSA produced 8.86 and 9.08 g/L ethanol, respectively. The fermentation time was significantly short for the prehydrolysate with 4% BSA and the glucose can be consumed with 12 h. This indicated that the fermentability of prehydrolysate was associated to the amount of BSA added into the pretreatment. In addition, it was observed that the volumetric ethanol productivity was higher with the higher BSA concentration. The volumetric ethanol productivity increased from 0.19 g/L/h (1% BSA) to 0.44 (2% BSA), 0.49 (3% BSA) and 0.77 g/L/h (4% BSA), respectively. Similarly, the glucose consumption rate increased from 0.56 g/L/h to 1.12, 1.22 and 1.61 g/L/h, respectively. The results indicated that 2% BSA was acceptable to make the prehydrolysates fermentable. As for substrates digestibility, the 72 h hydrolysis yield was similar and their yields was 70% (1% BSA), 71% (2% BSA), 72% (3% BSA) and 74% (4% BSA) respectively.

Example 11—BSA Detoxification of Biomass Prehydrolysates

Figure 5:
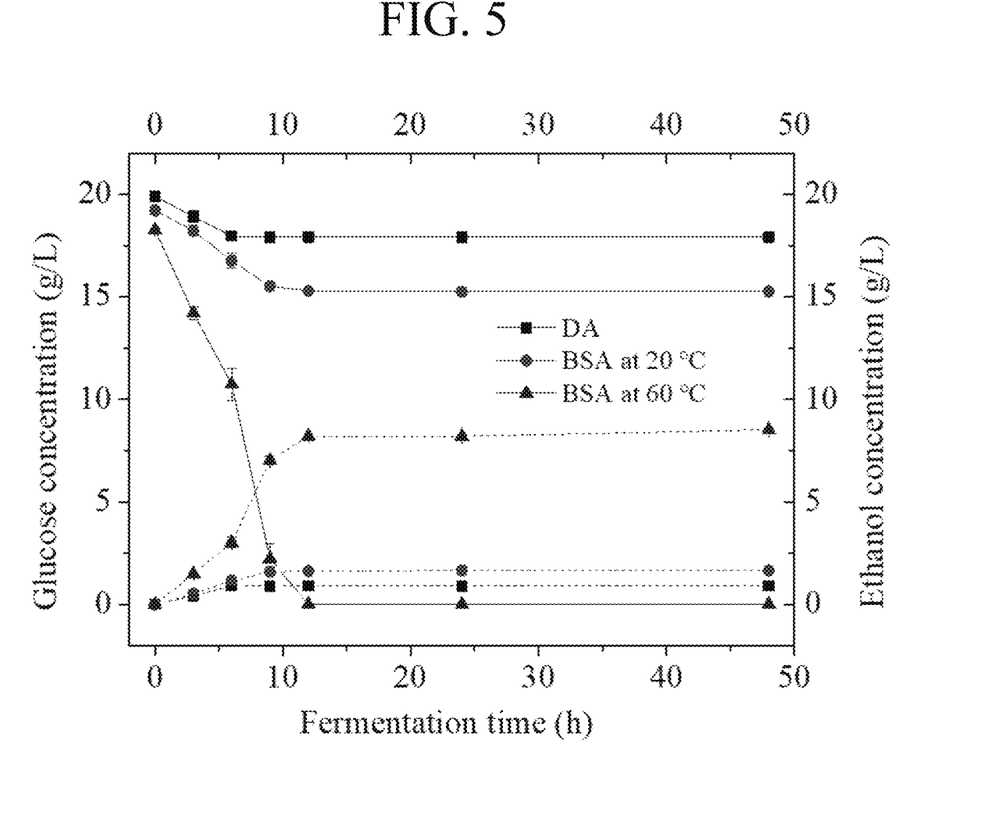
FIG. 5 is a graph showing the effect of detoxification temperatures on prehydrolysate fermentability in yeast fermentation.
Figure 6:
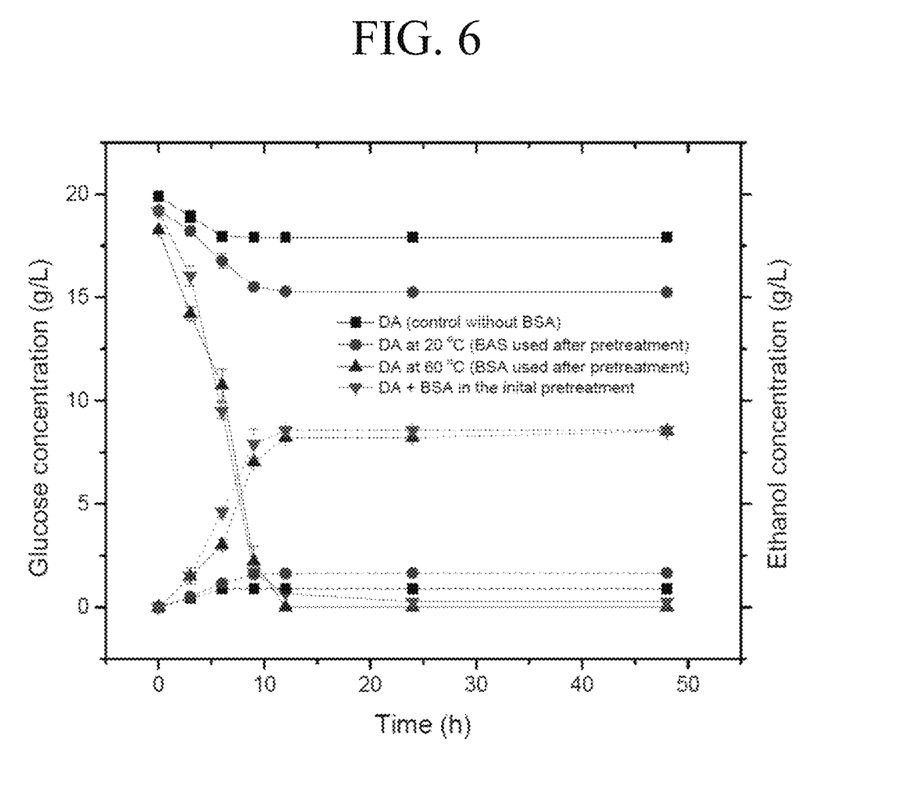
FIG. 6 is a graph showing the performance of BSA in the pretreatment vs BSA used after the pretreatment. The curves starting from 20 g/L are from the glucose consumption, the curves starting from 0 g/L are from the ethanol production.

To test whether BSA can detoxify the biomass prehydrolysates or only reduce the pretreatment severity, the dilute acid prehydrolysates were detoxified with 0.2% (w/v) BSA at 20 and 60° C. for 2 h (pH 6.0), respectively (FIG. 5). The results showed the high temperature detoxification (60° C.) made the prehydrolysates fermentable, while the low temperature did not. Specifically, the volumetric ethanol productivity increased from 0.15 (control) to 0.19 and 1.42 g/L/h for the prehydrolysates detoxified at 20 and 60° C., respectively. The glucose consumption rate increased from 0.32 (control) to 0.41 (DA-20) and 1.25 g/L (DA-60C), respectively. The final ethanol concentration reached 1.66 (DA-20) and 8.52 g/L (DA-60), respectively. The results indicated BSA could also detoxify the prehydrolysates, and the detoxification process was dependent on temperature.

In addition, BSA detoxification at 60° C. removed significant amounts of inhibitors in the prehydrolysates. Furfural was reduced by 74% from 2957.6 to 769.2 mg/L. HMF was decreased by 41% from 1480.7 to 867.7 mg/L. Similarly, vanillin was reduced by 53% from 55.5 to 26.2 mg/L. syringaldehyde was reduced by 57% from 104.4 to 44.5 mg/L. Syringlacetone was reduced by 42% from 58.2 to 33.6 mg/L. 1-(4-Hydroxy-3,5-dimethoxyphenyl)propane-1,2-dione was reduced by 77% from 26.2 to 6.0 mg/L. The results suggested that high temperature promoted the detoxification reaction between BSA and carbonyl compounds. Similar observations have been reported on cysteine and glycine detoxification of biomass hydrolysate, in which higher detoxification temperature resulted in higher fermentation rates and yields.

All documents cited are incorporated herein by reference; the citation of any document is not to be construed as an admission that it is prior art with respect to the present invention.

It is to be further understood that where descriptions of various embodiments use the term "comprising," and/or "including" those skilled in the art would understand that in some specific instances, an embodiment can be alternatively described using language "consisting essentially of" or "consisting of."

While particular embodiments of the present invention have been illustrated and described, it would be obvious to one skilled in the art that various other changes and modifications can be made without departing from the spirit and scope of the invention. It is therefore intended to cover in the appended claims all such changes and modifications that are within the scope of this invention.

What is claimed is:

1. A method for pretreating lignocellulosic biomass comprising:
   reacting lignocellulosic biomass with an acidic mixture while heating at a temperature from 120° C. to 200° C., producing a prehydrolysate mixture;
   wherein the acidic mixture comprises:
   i. one or more nucleophilic amino acids, hydrolyzed proteins, or combinations thereof; and
   ii. a dilute acid;
   and further, wherein the prehydrolysate mixture is produced without the addition of any enzymes to the lignocellulosic biomass or acidic mixture.

2. The method of claim 1 wherein said nucleophilic amino acids are selected from the group consisting of cysteine, histidine, lysine, tryptophan, and asparagine.

3. The method of claim 1 wherein the lignocellulosic biomass has a dry weight when it is dried and the one or more nucleophilic amino acids, hydrolyzed proteins, or combinations thereof comprise from 1 weight percent to 10 weight percent of the dry weight of the dried biomass.

4. The method of claim 1 wherein the lignocellulosic biomass has a dry weight when it is dried and the dilute acid comprises from 0.1 weight percent to 1 weight percent of the dry weight of the dried biomass.

5. A method for pretreating lignocellulosic biomass comprising:
   reacting lignocellulosic biomass with an acidic mixture while heating at a temperature from 120° C. to 200° C., producing a prehydrolysate mixture;
   wherein the acidic mixture comprises:
   i. soy protein isolate (SPI), bovine serum albumin (BSA), or a combination thereof; and
   ii. a dilute acid.

6. The method of claim 5 wherein said the acidic mixture comprises BSA.

7. The method of claim 5 wherein the lignocellulosic biomass has a dry weight when it is dried and the soy protein isolate (SPI), bovine serum albumin (BSA), or a combination thereof comprise from 1 weight percent to 10 weight percent of the dry weight of the dried biomass.

8. The method of claim 5 wherein the lignocellulosic biomass has a dry weight when it is dried and the dilute acid comprises from 0.1 weight percent to 1 weight percent of the dry weight of the dried biomass.

* * * * *